US009825542B2

(12) United States Patent
Huang et al.

(10) Patent No.: US 9,825,542 B2
(45) Date of Patent: Nov. 21, 2017

(54) SYSTEMS AND METHODS FOR ADJUSTING PEAK FREQUENCIES WITH DUTY CYCLES

(71) Applicant: ON-BRIGHT ELECTRONICS (SHANGHAI) CO., LTD., Shanghai (CN)

(72) Inventors: Xiaomin Huang, Shanghia (CN); Yuan Lin, Shanghai (CN); Huawei Lyu, Shanghai (CN); Lieyi Fang, Shanghai (CN)

(73) Assignee: On-Bright Electronics (Shanghai) Co., Ltd., Shanghai (CN)

(*) Notice: Subject to any disclaimer, the term of this patent is extended or adjusted under 35 U.S.C. 154(b) by 39 days.

(21) Appl. No.: 14/970,667

(22) Filed: Dec. 16, 2015

(65) Prior Publication Data

US 2017/0133941 A1    May 11, 2017

(30) Foreign Application Priority Data

Nov. 10, 2015   (CN) .......................... 2015 1 0760071

(51) Int. Cl.
*H02M 3/335*    (2006.01)
(52) U.S. Cl.
CPC ............................. *H02M 3/33523* (2013.01)
(58) Field of Classification Search
CPC ................... H02M 3/156; H02M 1/08; H02M 2001/0009; H02M 3/33523
See application file for complete search history.

(56) References Cited

U.S. PATENT DOCUMENTS 6,489,756 B2   12/2002  Kanouda et al.
7,388,764 B2    6/2008  Huynh et al.
(Continued)

FOREIGN PATENT DOCUMENTS

CN    101159415 A    4/2008
CN    102265232 A    11/2011
(Continued)

OTHER PUBLICATIONS

Taiwan Patent Office, Office Action dated Feb. 8, 2017, in Application No. 104143158, No English language translation has been located.

*Primary Examiner* — Adolf Berhane
*Assistant Examiner* — Afework Demisse
(74) *Attorney, Agent, or Firm* — Jones Day

(57) ABSTRACT

Systems and methods are provided for regulating a power converter. An example system controller includes: a first controller terminal configured to output a drive signal to a switch to affect a current flowing through a primary winding of a power converter, the drive signal being associated with a switching period corresponding to a switching frequency; and a second controller terminal configured to receive a feedback signal associated with an output voltage related to a secondary winding of the power converter. The first controller terminal is further configured to: output the drive signal to close the switch during the on-time period; and output the drive signal to open the switch during the off-time period. The system controller is configured to set the switching frequency to one or more frequency magnitudes, each of the one or more frequency magnitudes being smaller than or equal to an upper frequency limit.

51 Claims, 8 Drawing Sheets

(56) References Cited

U.S. PATENT DOCUMENTS

2012/0043954 A1* 2/2012 Lin .................. H02M 3/33507
                                              323/284
2014/0362621 A1* 12/2014 Huang .................... H02M 1/32
                                              363/50
2015/0085540 A1* 3/2015 Huang .................. H02H 5/042
                                              363/56.11

FOREIGN PATENT DOCUMENTS

| CN | 102904448 A | 1/2013 |
| CN | 103155390 A | 6/2013 |
| CN | 103312197 A | 9/2013 |
| CN | 103513571 A | 1/2014 |

* cited by examiner

SYSTEMS AND METHODS FOR ADJUSTING PEAK FREQUENCIES WITH DUTY CYCLES

1. CROSS-REFERENCES TO RELATED APPLICATIONS

This application claims priority to Chinese Patent Application No. 201510760071.6, filed Nov. 10, 2015, incorporated by reference herein for all purposes.

2. BACKGROUND OF THE INVENTION

Certain embodiments of the present invention are directed to integrated circuits. More particularly, some embodiments of the invention provide systems and methods for frequency adjustment based on duty cycles. Merely by way of example, some embodiments of the invention have been applied to power conversion systems. But it would be recognized that the invention has a much broader range of applicability.

FIG. 1 is a simplified diagram showing a conventional flyback power conversion system. The power conversion system 100 (e.g., a power converter) includes a system controller 102, a primary winding 130, a secondary winding 132, an auxiliary winding 134, a switch 120, a current sensing resistor 166, diodes 108, 110, and 144, capacitors 106, 150, 152, and 154, an electromagnetic interference (EMI) filter 180, a rectifying bridge 182, resistors 104, 153, 181, and 183, and an isolated feedback component 103. The isolated feedback component 103 includes resistors 160, 162, 168, and 186, a capacitor 164, a three-terminal regulator 172, and an opto-coupler 170.

For example, the power switch 120 includes a bipolar junction transistor. In another example, the power switch 120 includes a field effect transistor (e.g., a metal-oxide-semiconductor field effect transistor). In yet another example, the power switch 120 includes an insulated-gate bipolar transistor. As an example, the system controller 102 includes terminals (e.g., pins) 112, 114, 116, 118 and 199. As another example, the system controller 102 is a chip, which includes the pins 112, 114, 116, 118 and 199.

As shown in FIG. 1, an alternate-current input 198 is processed by the EMI filter 180, and the rectifying bridge 182 provides an input voltage 197 for the operations of the power conversion system 100. The power conversion system 100 uses a transformer including the primary winding 130 and the secondary winding 132 to isolate a primary side and a secondary side of the power conversion system 100. Information related to an output voltage 156 on the secondary side can be extracted through a voltage divider including the resistors 186 and 160.

The isolated feedback component 103 generates a feedback signal 158 based on information related to the output voltage 156. The controller 102 receives the feedback signal 158, and generates a drive signal 122 to turn on and off the switch 120 in order to regulate the output voltage 156. If the power switch 120 is closed (e.g., being turned on), the energy is stored in the transformer including the primary winding 130 and the secondary winding 132. The closed power switch 120 allows a current 124 to flow through the primary winding 130. The current 124 is sensed by the resistor 166 and converted into a current sensing signal 126 (e.g., $V_{cs}$) through the terminal 114 (e.g., terminal CS). Then, if the power switch 120 is open (e.g., being turned off), the stored energy is released to an output terminal 161, and the system 100 enters a demagnetization process.

Additionally, when the power switch 120 is turned off, the energy stored in the primary winding 130 is also transferred to the auxiliary winding 134 that is coupled to the primary winding 130. Consequently, the diode 108 becomes forward biased, and some energy stored in the primary winding is delivered to the capacitor 150 and used to provide a chip supply voltage 109 (e.g., $V_{CC}$) to the system controller 102 through the terminal 116 (e.g., terminal VCC). The combination of the auxiliary winding 134, the diode 108, and the capacitor 150 is part of a self-supply circuit. The operating frequency of the controller 102 (e.g., the frequency of the drive signal 122) is affected by the feedback signal 158. Different output loads correspond to different magnitudes of the feedback signal 158, and thus different operating frequencies of the controller 102. For a given output load, the larger the input voltage 197, the smaller a duty cycle of the drive signal 122 becomes; and the smaller the input voltage 197, the larger the duty cycle of the drive signal 122 becomes.

FIG. 2 is a simplified diagram showing certain conventional components of the system controller 102 as part of the power conversion system 100. The system controller 102 includes a transconductance amplifier 202, a summation component 204 (e.g., an adder), an oscillator 206, a modulation component 208 (e.g., a pulse-width-modulation component), and a driving component 210 (e.g., a driver).

As shown in FIG. 2, the transconductance amplifier 202 receives the feedback signal 158 and outputs a current signal 212 (e.g., $I_{fb1}$). The summation component 204 combines the current signal 212 and another current signal 214 (e.g., $I_1$) and outputs a combined current signal 216 (e.g., $I_{osc}$) to the oscillator 206 which generates an oscillation signal 218 (e.g., a clock signal). The modulation component 208 receives the oscillation signal 218 and the current sensing signal 126 and outputs a modulation signal 220 to the driving component 210 which generates the drive signal 122.

For example, the combined current signal 216 (e.g., $I_{osc}$) is equal in magnitude to a sum of the current signal 212 (e.g., $I_{fb1}$) and the current signal 214 (e.g., $I_1$). For applications that need peak output power, if the combined current signal 216 (e.g., $I_{osc}$) reaches a maximum magnitude (e.g., $I_{max}$), the operating frequency reaches a maximum magnitude (e.g., $F_{max}$).

FIG. 3 is a simplified diagram showing a conventional relationship between the operating frequency and the feedback signal 158 for the power conversion system 100. The waveform 300 represents the relationship between the operating frequency and the feedback signal 158. For example, certain magnitudes associated with the feedback signal 158 satisfy the following: $FB0_a \leq FB1_a \leq FB2_a \leq FB3_a \leq FB4_a$. As an example, a frequency lower limit $F_{min}$, a frequency magnitude $F_{normal}$ and a frequency upper limit $F_{max}$ satisfy the following: $F_{mina} \leq F_{normala} \leq F_{maxa}$.

As shown in FIG. 3, if the feedback signal 158 is in a range between the magnitude $FB0_a$ and the magnitude $FB1_a$, the operating frequency is kept at the lower limit $F_{mina}$. If the feedback signal 158 is in a range between the magnitude $FB1_a$ and the magnitude $FB2_a$, the operating frequency increases with the increasing feedback signal 158. If the feedback signal 158 is in a range between the magnitude $FB2_a$ and the magnitude $FB3_a$, the operating frequency is kept at the magnitude $F_{normala}$. If the feedback signal 158 is in a range between the magnitude $FB3_a$ and the magnitude $FB4_a$, the operating frequency increases with the increasing feedback signal 158. If the feedback signal 158 is larger than the magnitude $FB4_a$, the operating frequency is kept at the upper limit $F_{maxa}$. If the upper limit $F_{maxa}$ corresponds to a large magnitude, a source-drain voltage (e.g., $V_{ds}$) of the power switch 120 can have a large magnitude if the input voltage 197 has a large magnitude, which may lead to system damages in some circumstances.

Hence it is highly desirable to improve the techniques of peak frequency adjustment.

3. BRIEF SUMMARY OF THE INVENTION

Certain embodiments of the present invention are directed to integrated circuits. More particularly, some embodiments of the invention provide systems and methods for frequency adjustment based on duty cycles. Merely by way of example, some embodiments of the invention have been applied to power conversion systems. But it would be recognized that the invention has a much broader range of applicability.

According to one embodiment, a system controller for regulating a power converter includes: a first controller terminal configured to output a drive signal to a switch to affect a current flowing through a primary winding of a power converter, the drive signal being associated with a switching period including an on-time period and an off-time period, the switching period corresponding to a switching frequency; and a second controller terminal configured to receive a feedback signal associated with an output voltage related to a secondary winding of the power converter, the secondary winding being coupled to the primary winding. The first controller terminal is further configured to: output the drive signal to close the switch during the on-time period; and output the drive signal to open the switch during the off-time period. A duty cycle is equal to a duration of the on-time period divided by a duration of the switching period. The system controller is configured to set the switching frequency to one or more frequency magnitudes, each of the one or more frequency magnitudes being smaller than or equal to an upper frequency limit. The system controller is further configured to: increase the upper frequency limit within a first magnitude range in response to the increasing duty cycle; and decrease the upper frequency limit within the first magnitude range in response to the decreasing duty cycle.

According to another embodiment, a system controller for regulating a power converter includes: an oscillator configured to receive an oscillation current and generate a ramp signal and a clock signal based at least in part on the oscillation current, the ramp signal and the clock signal being associated with an operating frequency of the system controller; a modulation component configured to generate a modulation signal based at least in part on the clock signal; a sample-and-hold component configured to sample the ramp signal in response to the modulation signal and generate a sampled signal based at least in part on the ramp signal; a low pass filter configured to generate a filtered signal based at least in part on the sampled signal; a first transconductance amplifier configured to generate a first current based at least in part on the filtered signal; a first summation component configured to receive the first current and a second current and generate the oscillation current based at least in part on the first current and the second current; and a driver configured to generate a drive signal based at least in part on the modulation signal and output the drive signal to a switch to affect a third current flowing through a primary winding of a power converter.

According to yet another embodiment, a system controller for regulating a power converter includes: a first controller terminal configured to receive a first signal related to a first current flowing through a primary winding of a power converter, the primary winding being configured to receive an input voltage; and a second controller terminal configured to output a drive signal to a switch to affect the first current flowing through the primary winding of the power converter, the drive signal being associated with a switching period corresponding to a switching frequency. The system controller is configured to set the switching frequency to one or more frequency magnitudes, each of the one or more frequency magnitudes being smaller than or equal to an upper frequency limit. The system controller is further configured to: increase the upper frequency limit within a first magnitude range in response to the decreasing input voltage; and decrease the upper frequency limit within the first magnitude range in response to the increasing input voltage.

In one embodiment, a method for regulating a power converter includes: receiving a feedback signal associated with an output voltage related to a secondary winding of a power converter, the secondary winding being coupled to a primary winding of the power converter; determining a switching frequency to one or more frequency magnitudes based at least in part on the feedback signal, each of the one or more frequency magnitudes being smaller than or equal to an upper frequency limit; generating a drive signal associated with the switching frequency, the switching frequency corresponding to a switching period, the switching period including an on-time period and an off-time period; outputting the drive signal to a switch to affect a current flowing through the primary winding. The outputting the drive signal to a switch to affect a current flowing through the primary winding includes: outputting the drive signal to close the switch during the on-time period; and outputting the drive signal to open the switch during the off-time period. A duty cycle is equal to a duration of the on-time period divided by a duration of the switching period. The setting a switching frequency to one or more frequency magnitudes includes: increasing the upper frequency limit within a first magnitude range in response to the increasing duty cycle; and decreasing the upper frequency limit within the first magnitude range in response to the decreasing duty cycle.

In another embodiment, a method for regulating a power converter includes: receiving an oscillation current; generating a ramp signal and a clock signal based at least in part on the oscillation current, the ramp signal and the clock signal being associated with an operating frequency; receiving the clock signal; generating a modulation signal based at least in part on the clock signal; receiving the ramp signal and the modulation signal; sampling the ramp signal in response to the modulation signal; generating a sampled signal based at least in part on the ramp signal; receiving the sampled signal; generating a filtered signal based at least in part on the sampled signal; receiving the filtered signal; generating a first current based at least in part on the filtered signal; receiving the first current and a second current; generating the oscillation current based at least in part on the first current and the second current; receiving the modulation signal; generating a drive signal based at least in part on the modulation signal; and outputting the drive signal to a switch to affect a third current flowing through a primary winding of a power converter.

In yet another embodiment, a method for regulating a power converter includes: receiving a first signal related to a current flowing through a primary winding of a power converter, the primary winding being configured to receive an input voltage; determining a switching frequency to one or more frequency magnitudes, each of the one or more frequency magnitudes being smaller than or equal to an upper frequency limit; generating a drive signal associated with the switching frequency, the switching frequency corresponding to a switching period; outputting the drive signal to a switch to affect the current flowing through the primary winding of the power converter. The determining a switching frequency to one or more frequency magnitudes includes: increasing the upper frequency limit within a first magnitude range in response to the decreasing input voltage; and decreasing the upper frequency limit within the first magnitude range in response to the increasing input voltage.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to integrated circuits. More particularly, some embodiments of the invention provide systems and methods for frequency adjustment based on duty cycles. Merely by way of example, some embodiments of the invention have been applied to power conversion systems. But it would be recognized that the invention has a much broader range of applicability.

As discussed above, for a large output load, the larger the input voltage 197, the smaller a duty cycle of the drive signal 122 becomes; and the smaller the input voltage 197, the larger the duty cycle of the drive signal 122 becomes. The duty cycle can be used to affect the magnitude of the upper limit $F_{max}$ of the operating frequency.

Figure 1:
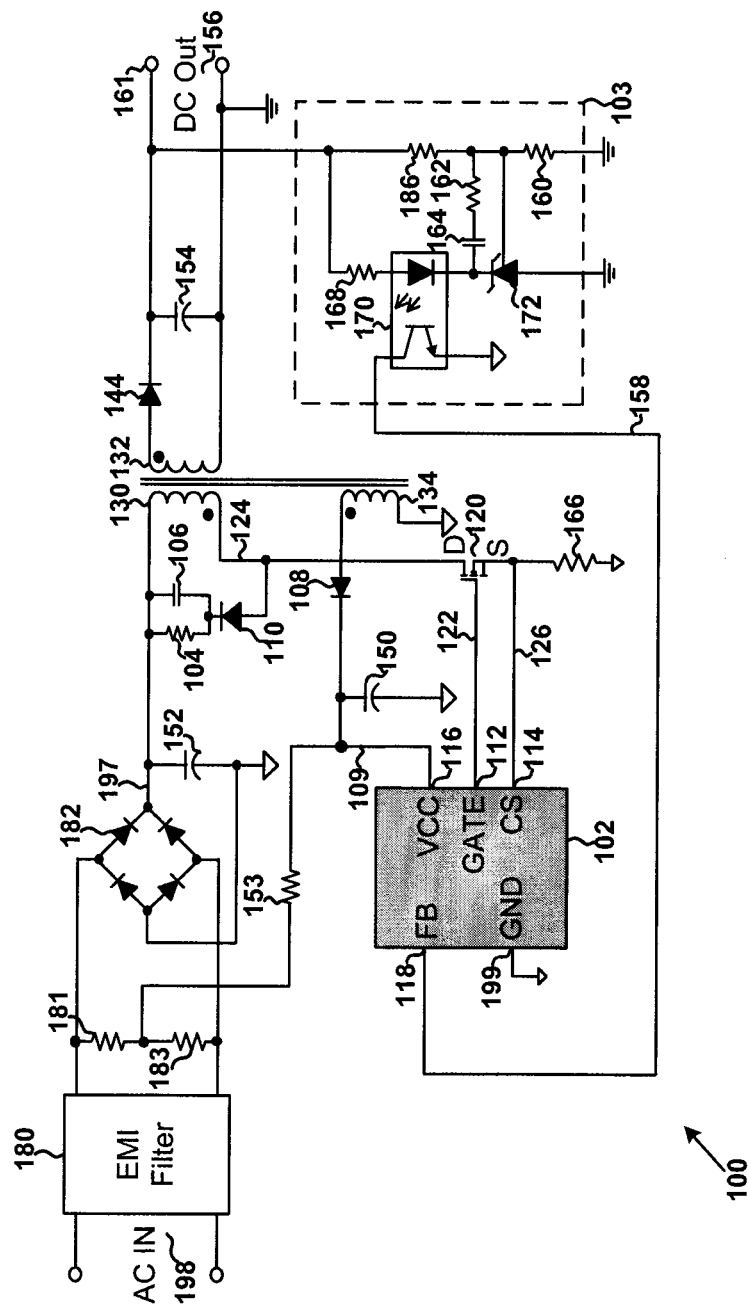
FIG. 1 is a simplified diagram showing a conventional flyback power conversion system.
Figure 2:
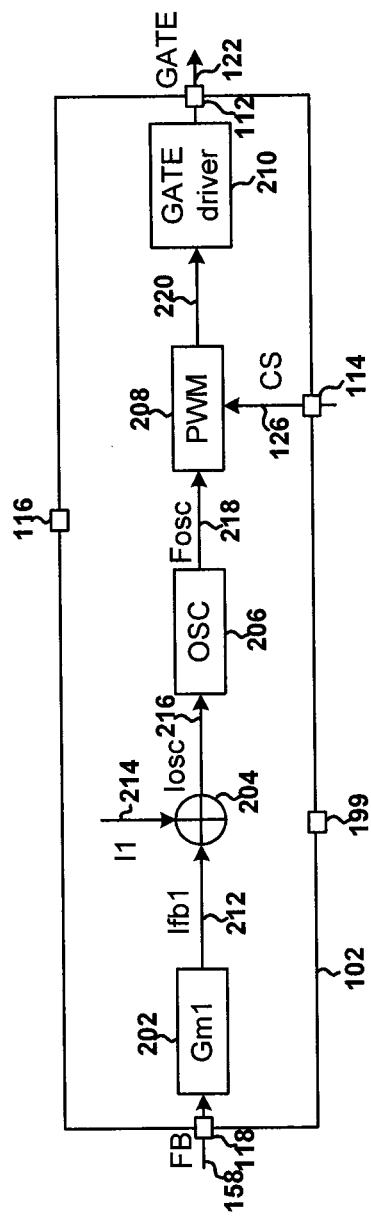
FIG. 2 is a simplified diagram showing certain conventional components of a system controller as part of the power conversion system as shown in FIG. 1.
Figure 3:
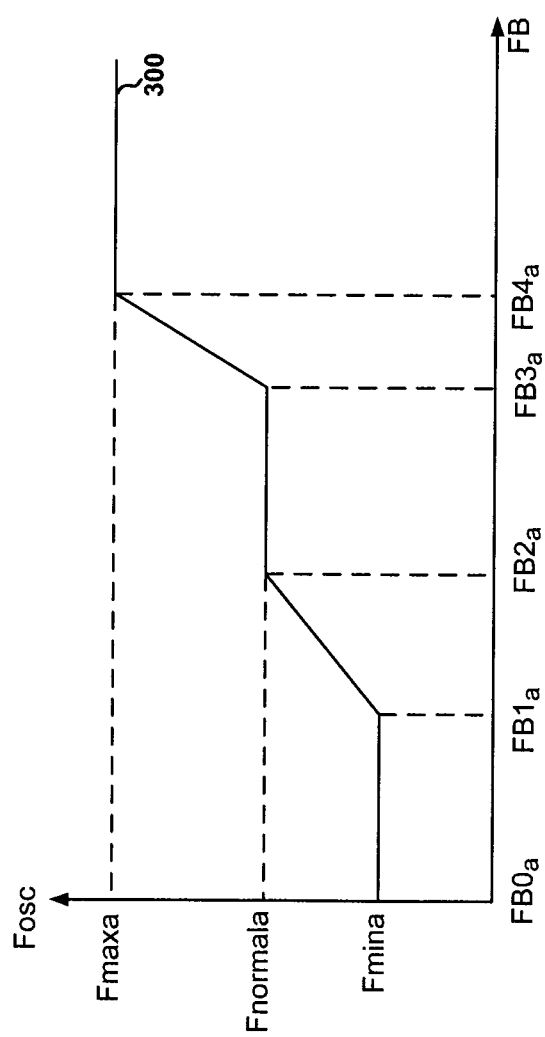
FIG. 3 is a simplified diagram showing a conventional relationship between an operating frequency and a feedback signal for the power conversion system as shown in FIG. 1.
Figure 4:
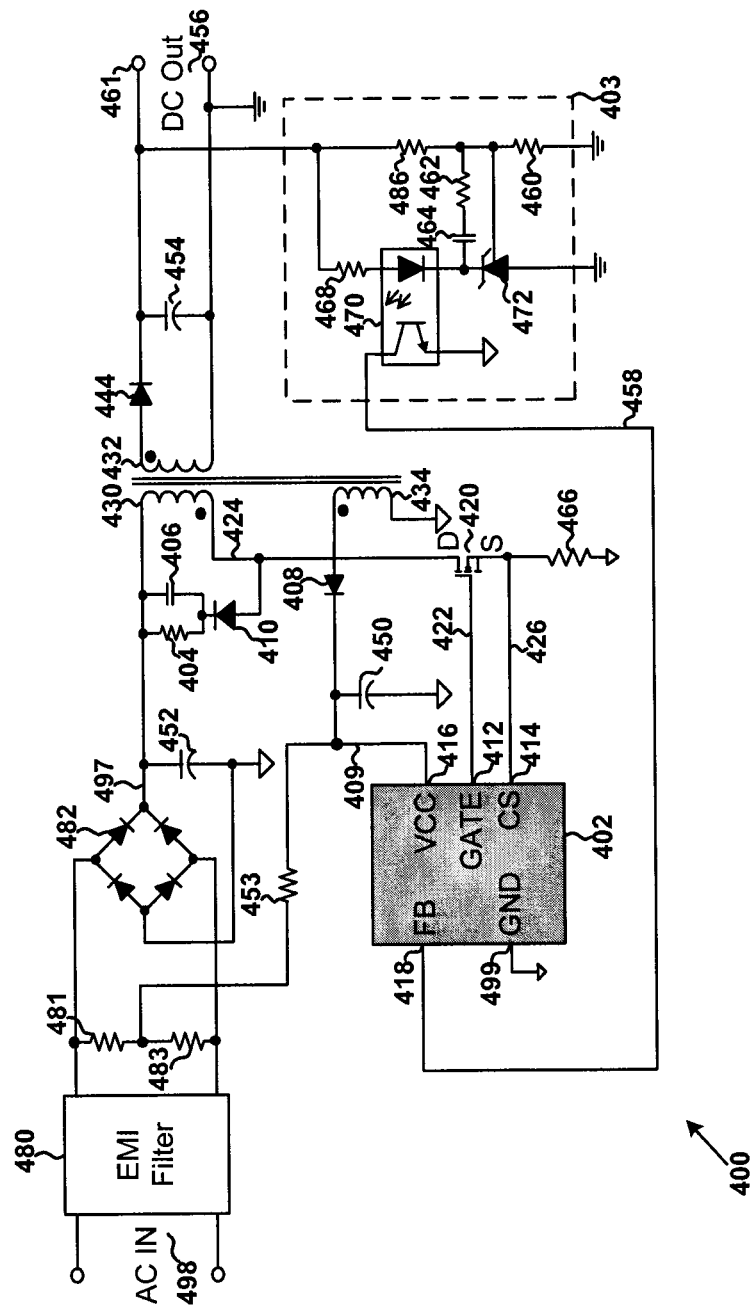
FIG. 4 is a simplified diagram showing a power conversion system according to an embodiment of the present invention.

FIG. 4 is a simplified diagram showing a power conversion system, according to an embodiment of the present invention. This diagram is merely an example, which should not unduly limit the scope of the claims. One of ordinary skill in the art would recognize many variations, alternatives, and modifications. The power conversion system 400 (e.g., a power converter) includes a system controller 402, a primary winding 430, a secondary winding 432, an auxiliary winding 434, a switch 420, a current sensing resistor 466, diodes 408, 410, and 444, capacitors 406, 450, 452, and 454, an electromagnetic interference (EMI) filter 480, a rectifying bridge 482, resistors 404, 453, 481, and 483, and an isolated feedback component 403.

For example, the isolated feedback component 403 includes resistors 460, 462, 468, and 486, a capacitor 464, a three-terminal regulator 472, and an opto-coupler 470. As an example, the power switch 420 includes a bipolar junction transistor. In another example, the power switch 420 includes a field effect transistor (e.g., a metal-oxide-semiconductor field effect transistor). In yet another example, the power switch 420 includes an insulated-gate bipolar transistor. As another example, the system controller 402 includes terminals (e.g., pins) 412, 414, 416, 418 and 499. As another example, the system controller 402 is a chip, which includes the pins 412, 414, 416, 418 and 499.

As shown in FIG. 4, an alternate-current input 498 is processed by the EMI filter 480, and the rectifying bridge 482 provides an input voltage 497 for the operations of the power conversion system 400, according to some embodiments. For example, the power conversion system 400 uses a transformer including the primary winding 430 and the secondary winding 432 to isolate a primary side and a secondary side of the power conversion system 400. As an example, information related to an output voltage 456 on the secondary side can be extracted through a voltage divider including the resistors 486 and 460.

According to another embodiment, the isolated feedback component 403 generates a feedback signal 458 based on information related to the output voltage 456. For example, the controller 402 receives the feedback signal 458, and generates a drive signal 422 to turn on and off the switch 420 in order to regulate the output voltage 456. In another example, if the power switch 420 is closed (e.g., being turned on), the energy is stored in the transformer including the primary winding 430 and the secondary winding 432. As an example, the closed power switch 420 allows a current 424 to flow through the primary winding 430. As another example, the current 424 is sensed by the resistor 466 and converted into a current sensing signal 426 (e.g., Vcs) through the terminal 414 (e.g., terminal CS). As yet another example, if the power switch 420 is open (e.g., being turned off), the stored energy is released to an output terminal 461, and the system 400 enters a demagnetization process.

According to yet another embodiment, when the power switch 420 is turned off, the energy stored in the primary winding 430 is also transferred to the auxiliary winding 434 that is coupled to the primary winding 430. For example, the diode 408 becomes forward biased, and some energy stored in the primary winding is delivered to the capacitor 450 and used to provide a chip supply voltage 409 (e.g., VCC) to the system controller 402 through the terminal 416 (e.g., terminal VCC). In another example, the combination of the auxiliary winding 434, the diode 408, and the capacitor 450 is part of a self-supply circuit. In yet another example, the operating frequency of the controller 402 (e.g., the frequency of the drive signal 422) of the power switch 420 is affected by the feedback signal 458.

In some embodiments, different output loads correspond to different magnitudes of the feedback signal 458, and thus different operating frequencies of the power switch 420. As an example, for a given output load, the larger the input voltage 497, the smaller a duty cycle of the drive signal 422 becomes; and the smaller the input voltage 497, the larger the duty cycle of the drive signal 422 becomes. In another example, if the input voltage 497 has a large magnitude, the duty cycle of the drive signal 422 is small. For example, if the input voltage 497 increases in magnitude, the current 424 increases in magnitude. Thus, the current sensing signal 426 reaches or exceeds a threshold faster, and the on-time period of the switch 420 ends faster, which results in the duty cycle of the drive signal 422 becomes smaller.

In certain embodiments, the system controller 102 is configured to adjust the duty cycle to affect an upper limit (e.g., $F_{max}$) of the operating frequency. As an example, the upper limit (e.g., $F_{max}$) of the operating frequency increases (e.g., linearly) with the increasing duty cycle of the drive signal 422. In another example, the upper limit (e.g., $F_{max}$) of the operating frequency decreases with the increasing input voltage 497 over time as the duty cycle of the drive signal 422 decreases with the increasing input voltage over time. In yet another example, if the upper limit (e.g., $F_{max}$) of the operating frequency decreases, the demagnetization period becomes longer, and a source-drain voltage (e.g., $V_{ds}$) of the power switch 420 becomes smaller, thus reducing the risk of system damages.

Figure 5:
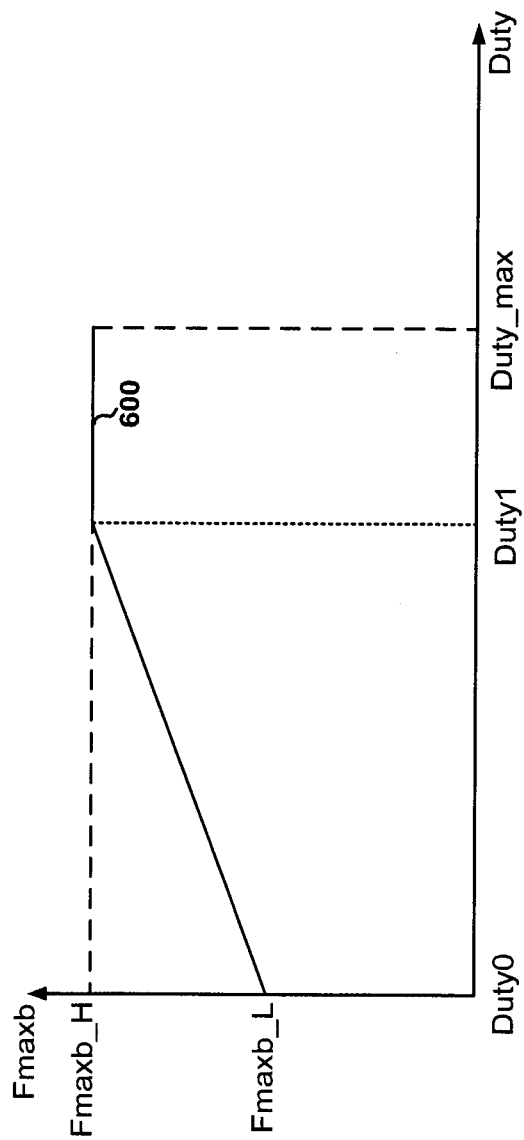
FIG. 5 is a simplified diagram showing a relationship between an upper limit of an operating frequency and a duty cycle of the drive signal for the system controller as part of the power conversion system as shown in FIG. 4 according to an embodiment of the present invention.

FIG. 5 is a simplified diagram showing a relationship between an upper limit of the operating frequency and the duty cycle of the drive signal 422 for the system controller 402 as part of the power conversion system 400 according to an embodiment of the present invention. This diagram is merely an example, which should not unduly limit the scope of the claims. One of ordinary skill in the art would recognize many variations, alternatives, and modifications. The waveform 600 represents the relationship between an upper limit (e.g., $F_{maxb}$) of the operating frequency and the duty cycle of the drive signal 422 associated with the power switch 420. For example, certain magnitudes associated with the duty cycle satisfy the following: Duty0≤Duty1≤Duty_max. As an example, frequency magnitudes $F_{maxb\_L}$ and $F_{maxb\_H}$ satisfy the following: $F_{maxb\_L} \leq F_{maxb\_H}$.

According to one embodiment, if the duty cycle of the drive signal 422 is in a range between the magnitude Duty0 and the magnitude Duty1, the upper limit of the operating frequency of the controller 402 (e.g., the upper limit of the frequency of the drive signal 422) increases (e.g., from $F_{maxb\_L}$ to $F_{maxb\_H}$) with the increasing duty cycle. For example, the upper limit of the operating frequency of the controller 402 (e.g., the upper limit of the frequency of the drive signal 422) increases linearly from $F_{maxb\_L}$ to $F_{maxb\_H}$) if the duty cycle of the drive signal 422 increases from Duty0 to Duty1. In another example, if the duty cycle of the drive signal 422 is in a range between the magnitude Duty1 and Duty_max, the upper limit of the operating frequency of the controller 402 (e.g., the upper limit of the frequency of the drive signal 422) remains constant at the magnitude $F_{max\_H}$.

Figure 6:
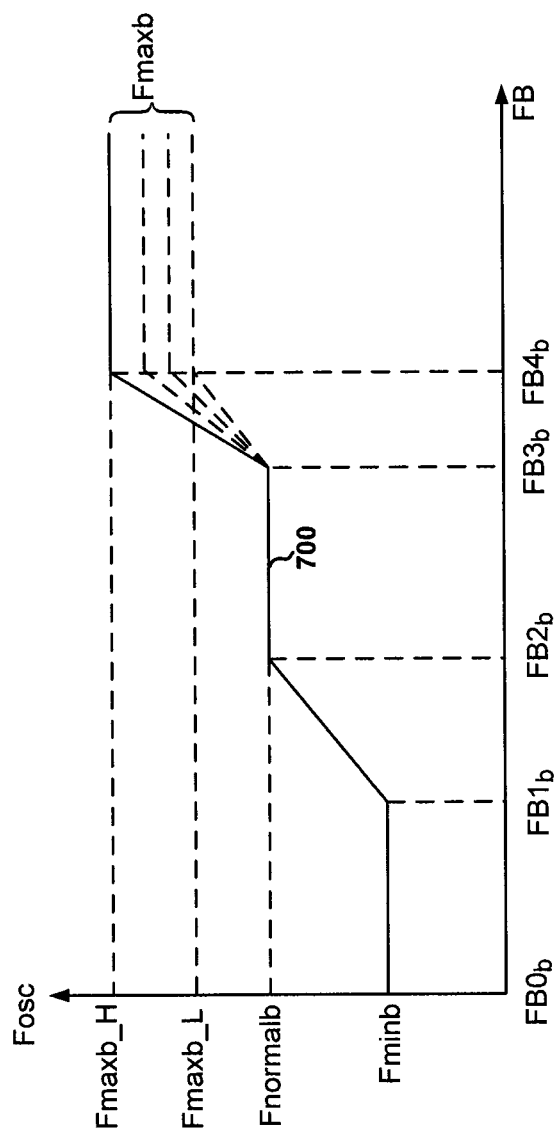
FIG. 6 is a simplified diagram showing a relationship between an operating frequency and a feedback signal for the power conversion system as shown in FIG. 4 according to an embodiment of the present invention.

FIG. 6 is a simplified diagram showing a relationship between the operating frequency and the feedback signal 458 for the power conversion system 400 according to an embodiment of the present invention. This diagram is merely an example, which should not unduly limit the scope of the claims. One of ordinary skill in the art would recognize many variations, alternatives, and modifications. The waveform 700 represents the relationship between the operating frequency and the feedback signal 458. For example, certain magnitudes associated with the feedback signal 458 satisfy the following: $FB0_b \leq FB1_b \leq FB2_b \leq FB3_b \leq FB4_b$. As an example, a frequency lower limit $F_{minb}$, a frequency magnitude $F_{normalb}$ and a frequency upper limit $F_{maxb}$ satisfy the following: $F_{minb} \leq F_{normalb} \leq F_{maxb}$.

As shown in FIG. 6, if the feedback signal 458 is in a range between the magnitude $FB0_b$ and the magnitude $FB1_b$, the operating frequency is kept at the lower limit $F_{minb}$, according to some embodiments. For example, if the feedback signal 458 is in a range between the magnitude $FB1_b$ and the magnitude $FB2_b$, the operating frequency increases (e.g., increases linearly from $F_{minb}$ to $F_{normalb}$) with the increasing feedback signal 458. In another example, if the feedback signal 458 is in a range between the magnitude $FB2_b$ and the magnitude $FB3_b$, the operating frequency is kept at the magnitude $F_{normalb}$. As yet another example, if the feedback signal 458 is in a range between the magnitude $FB3_b$ and the magnitude $FB4_b$, the operating frequency increases (e.g., increases linearly from $F_{normalb}$ to $F_{maxb}$) with the increasing feedback signal 458. As yet another example, if the feedback signal 458 is larger than the magnitude $FB4_b$, the operating frequency is kept at the upper limit $F_{maxb}$.

In one embodiment, the upper limit $F_{maxb}$ has a relationship with the duty cycle of the drive signal 422 as shown in FIG. 5. For example, the larger the input voltage 497, the smaller the duty cycle of the drive signal 422 becomes and the smaller the upper limit $F_{maxb}$ becomes. In another example, if the input voltage 497 increases in magnitude, the duty cycle of the drive signal 422 decreases and the upper limit $F_{maxb}$ also decreases. As an example, the smallest of the frequency upper limit corresponds to the frequency magnitude $F_{maxb\_L}$ (e.g., as shown in FIG. 5). As another example, the largest of the frequency upper limit corresponds to the frequency magnitude $F_{maxb\_H}$ (e.g., as shown in FIG. 5).

Figure 7:
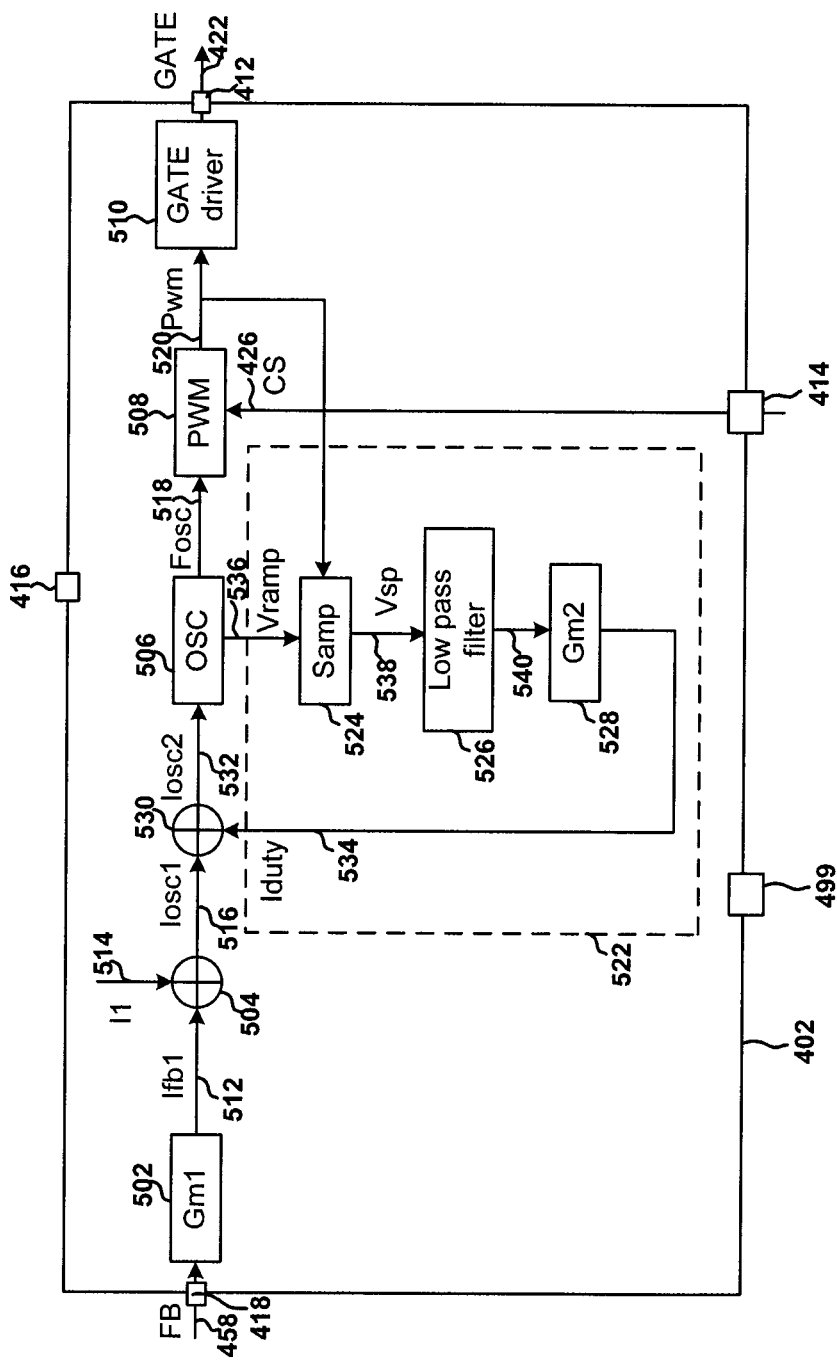
FIG. 7 is a simplified diagram showing certain components of a system controller as part of the power conversion system as shown in FIG. 4 according to an embodiment of the present invention.

FIG. 7 is a simplified diagram showing certain components of the system controller 402 as part of the power conversion system 400 according to an embodiment of the present invention. This diagram is merely an example, which should not unduly limit the scope of the claims. One of ordinary skill in the art would recognize many variations, alternatives, and modifications. The system controller 402 includes a first transconductance amplifier 502, a first summation component 504 (e.g., an adder), an oscillator 506, a modulation component 508 (e.g., a pulse-width-modulation component), a driving component 510 (e.g., a driver), a frequency adjustment component 522 (e.g., a pulse-frequency-modulation component), and a second summation component 530 (e.g., an adder). For example, the frequency adjustment component 522 includes a sample-and-hold component 524, a low pass filter 526, and a second transconductance amplifier 528.

As shown in FIG. 7, the first transconductance amplifier 502 receives the feedback signal 458 and outputs a current signal 512 (e.g., $I_{fb1}$), according to some embodiments. For example, the first summation component 504 combines the current signal 512 and another current signal 514 (e.g., $I_1$) and outputs a current signal 516 (e.g., $I_{osc1}$). As an example, the second summation component 530 combines the current signal 516 (e.g., $I_{osc1}$) and another current signal 534 (e.g., $I_{duty}$) which is generated by the frequency adjustment component 522. As another example, the second summation component 530 outputs a combined current signal 532 (e.g., $I_{osc2}$) to the oscillator 506 which generates an oscillation signal 518 (e.g., a clock signal). As yet another example, the modulation component 508 receives the oscillation signal 518 and the current sensing signal 426 and outputs a modulation signal 520 (e.g., a pulse-width-modulation signal) to the driving component 510 which generates the drive signal 422. In some embodiments, the current signal 516 (e.g., $I_{osc1}$) is equal in magnitude to a sum of the current signal 512 (e.g., $I_{fb1}$) and the current signal 514 (e.g., $I_1$). For example, the combined current signal 532 (e.g., $I_{osc2}$) is equal in magnitude to a sum of the current signal 516 (e.g., $I_{osc1}$) and the current signal 534 (e.g., $I_{duty}$).

According to one embodiment, the sample-and-hold component 524 samples a ramp signal 536 from the oscillator 506 and generates a signal 538 (e.g., $V_{sp}$) which is processed by the low pass filter 526. For example, the transconductance amplifier 528 converts a filtered signal 540 from the low pass filter 526 to the current signal 534 (e.g., $I_{duty}$) which is related to the duty cycle of the drive signal 422. As an example, the larger in magnitude the signal 538 (e.g., $V_{sp}$) is, the larger in magnitude the current signal 534 (e.g., $I_{duty}$) is. As another example, the current signal 532 is determined as follows:

$$I_{osc2}=I_{osc1}+I_{duty}=I_1+I_{fb1}+I_{duty} \qquad (1)$$

where $I_{osc2}$ represents the current signal 532, $I_{osc1}$ represents the current signal 516, $I_{duty}$ represents the current signal 534, $I_1$ represents the current signal 514, and $I_{fb1}$ represents the current signal 512. As such, the larger the duty cycle is (e.g., within a certain range), the larger the operating frequency is, and the smaller the duty cycle is (e.g., within the certain range), the smaller the operating frequency is, according to some embodiments.

Figure 8:
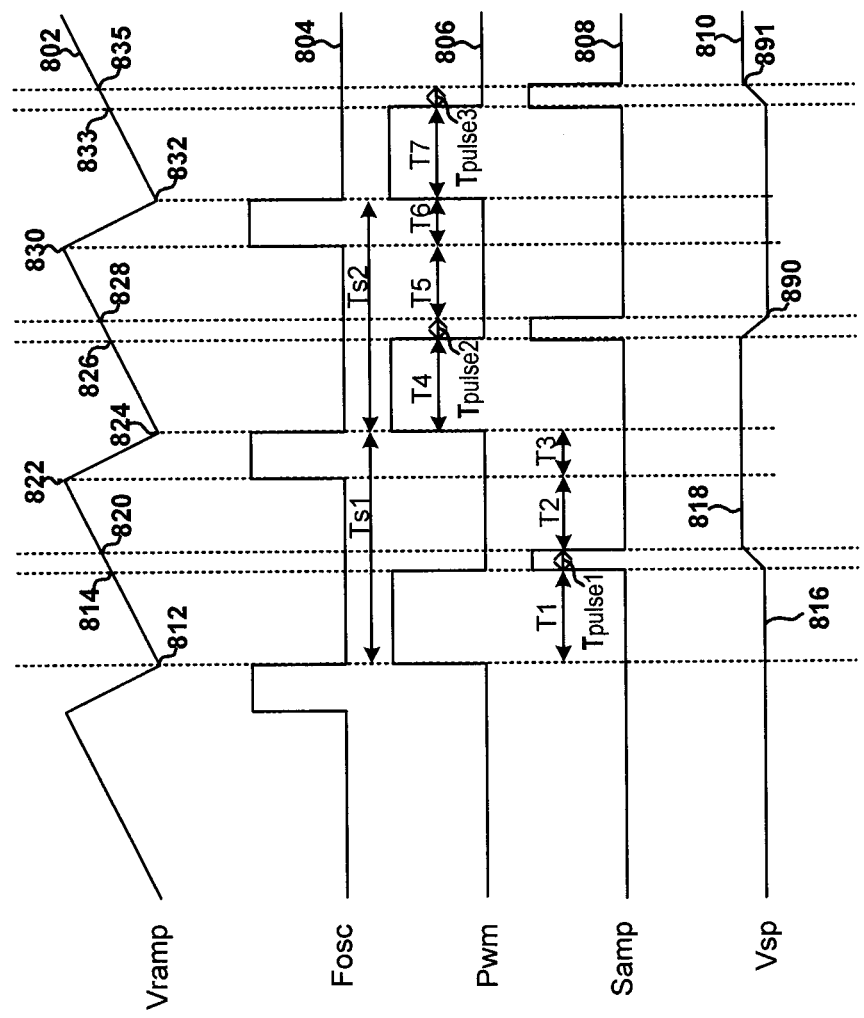
FIG. 8 is a simplified timing diagram for the system controller as part of the power conversion system as shown in FIG. 4 according to an embodiment of the present invention.

FIG. 8 is a simplified timing diagram for the system controller 402 as part of the power conversion system 400 according to an embodiment of the present invention. This diagram is merely an example, which should not unduly limit the scope of the claims. One of ordinary skill in the art would recognize many variations, alternatives, and modifications. The waveform 802 represents the ramp signal 536 as a function of time, the waveform 804 represents the oscillation signal 518 as a function of time, the waveform 806 represents the modulation signal 520 as a function of time, the waveform 808 represents a sampling signal for the sample-and-hold component 524 as a function of time, and the waveform 810 represents the signal 538 (e.g., $V_{sp}$) as a function of time.

According to one embodiment, during a time period $T_1$ within a switching period $T_{s1}$, the oscillation signal 518 (e.g., $F_{osc}$) is at a logic low level, and the ramp signal 536 (e.g., $V_{ramp}$) increases in magnitude (e.g., from the magnitude 812 to the magnitude 814). For example, during the time period $T_1$, the modulation signal 520 (e.g., PWM) is at a logic high level and the signal 538 (e.g., $V_{sp}$) remains at the magnitude 816.

According to another embodiment, at the end of the time period $T_1$, the modulation signal 520 (e.g., PWM) changes from the logic high level to the logic low level. For example, a pulse appears in the sampling signal (e.g., as shown by the waveform 808) at the end of the time period $T_1$, and the sample-and-hold component 524 samples the ramp signal 536 (e.g., $V_{ramp}$) during the pulse (e.g., $T_{pulse1}$). In yet another example, during the pulse (e.g., $T_{pulse1}$), the ramp signal 536 (e.g., $V_{ramp}$) increases in magnitude (e.g., from the magnitude 814 to the magnitude 820). In yet another example, the signal 538 (e.g., $V_{sp}$) increases in magnitude (e.g., from the magnitude 816 to the magnitude 818). In yet another example, the magnitude 818 represents the magnitude 820 (e.g., the magnitude 818 being equal to the magnitude 820).

According to yet another embodiment, during a time period $T_2$ within the switching period $T_{s1}$, the oscillation signal 518 (e.g., $F_{osc}$) remains at the logic low level, and the ramp signal 536 (e.g., $V_{ramp}$) increases in magnitude (e.g., from the magnitude 820 to the magnitude 822). For example, during the time period $T_2$, the modulation signal 520 (e.g., PWM) remains at the logic low level and the signal 538 (e.g., $V_{sp}$) remains at the magnitude 818. As an example, at the end of the time period $T_2$, the oscillation signal 518 (e.g., $F_{osc}$) changes from the logic low level to the logic high level, and the ramp signal 536 (e.g., $V_{ramp}$) begins to decrease in magnitude.

In one embodiment, during a time period $T_3$ within the switching period $T_{s1}$, the oscillation signal 518 (e.g., $F_{osc}$) remains at the logic high level, and the ramp signal 536 (e.g., $V_{ramp}$) decreases in magnitude (e.g., from the magnitude 822 to the magnitude 824). For example, during the time period $T_3$, the modulation signal 520 (e.g., PWM) remains at the logic low level and the signal 538 (e.g., $V_{sp}$) remains at the magnitude 818. As an example, at the end of the time period $T_3$, the oscillation signal 518 (e.g., $F_{osc}$) changes from the logic high level to the logic low level, and the ramp signal 536 (e.g., $V_{ramp}$) begins to increase in magnitude again.

In another embodiment, during a time period $T_4$ within a switching period $T_{s2}$, the oscillation signal 518 (e.g., $F_{osc}$) remains at the logic low level, and the ramp signal 536 (e.g., $V_{ramp}$) increases in magnitude (e.g., from the magnitude 824 to the magnitude 826). For example, during the time period $T_4$, the modulation signal 520 (e.g., PWM) remains at the logic high level and the signal 538 (e.g., $V_{sp}$) remains at the magnitude 818.

In yet another embodiment, at the end of the time period $T_4$, the modulation signal 520 (e.g., PWM) changes from the logic high level to the logic low level. For example, another pulse appears in the sampling signal (e.g., as shown by the waveform 808) at the end of the time period $T_4$, and the sample-and-hold component 524 samples the ramp signal 536 (e.g., $V_{ramp}$) during the pulse (e.g., $T_{pulse2}$). In yet another example, during the pulse (e.g., $T_{pulse2}$), the ramp signal 536 (e.g., $V_{ramp}$) increases in magnitude (e.g., from the magnitude 826 to the magnitude 828).

As shown in FIG. 8, the time period $T_4$ is smaller than the time period $T_3$, and $T_{pulse1}$ is equal to $T_{pulse2}$, according to certain embodiments. For example, the magnitude 828 is smaller than the magnitude 820. In another example, the signal 538 (e.g., $V_{sp}$) decreases in magnitude (e.g., from the magnitude 818 to the magnitude 828). In yet another example, the magnitude 890 represents the magnitude 828 (e.g., the magnitude 890 being equal to the magnitude 828, which is smaller than the magnitude 820).

In yet another embodiment, during a time period $T_5$ within the switching period $T_{s2}$, the oscillation signal 518 (e.g., $F_{osc}$) remains at the logic low level, and the ramp signal 536 (e.g., $V_{ramp}$) increases in magnitude (e.g., from the magnitude 828 to the magnitude 830). For example, during the time period $T_5$, the modulation signal 520 (e.g., PWM) remains at the logic low level and the signal 538 (e.g., $V_{sp}$) remains at the magnitude 890. As an example, at the end of the time period $T_5$, the oscillation signal 518 (e.g., $F_{osc}$) changes from the logic low level to the logic high level, and the ramp signal 536 (e.g., $V_{ramp}$) begins to decrease in magnitude.

In yet another embodiment, during a time period $T_6$ within the switching period $T_{s2}$, the oscillation signal 518 (e.g., $F_{osc}$) remains at the logic high level, and the ramp signal 536 (e.g., $V_{ramp}$) decreases in magnitude (e.g., from the magnitude 830 to the magnitude 832). For example, during the time period $T_6$, the modulation signal 520 (e.g., PWM) remains at the logic low level and the signal 538 (e.g., $V_{sp}$) remains at the magnitude 890.

In another embodiment, during a time period $T_7$ within a next switching period that follows $T_{s2}$, the oscillation signal 518 (e.g., $F_{osc}$) remains at the logic low level, and the ramp signal 536 (e.g., $V_{ramp}$) increases in magnitude (e.g., from the magnitude 832 to the magnitude 833). For example, during the time period $T_7$, the modulation signal 520 (e.g., PWM) remains at the logic high level and the signal 538 (e.g., $V_{sp}$) remains at the magnitude 890.

In yet another embodiment, at the end of the time period $T_7$, the modulation signal 520 (e.g., PWM) changes from the logic high level to the logic low level. For example, another pulse appears in the sampling signal (e.g., as shown by the waveform 808) at the end of the time period $T_7$, and the sample-and-hold component 524 samples the ramp signal 536 (e.g., $V_{ramp}$) during the pulse (e.g., $T_{pulse3}$). In yet another example, during the pulse (e.g., $T_{pulse3}$), the ramp signal 536 (e.g., $V_{ramp}$) increases in magnitude (e.g., from the magnitude 833 to the magnitude 835).

As shown in FIG. 8, the time period $T_7$ is larger than the time period $T_4$, and $T_{pulse3}$ is equal to $T_{pulse2}$, according to certain embodiments. For example, the magnitude 828 is smaller than the magnitude 835. In another example, the signal 538 (e.g., $V_{sp}$) increases in magnitude (e.g., from the magnitude 890 to the magnitude 891). In yet another example, the magnitude 891 represents the magnitude 835 (e.g., the magnitude 891 being equal to the magnitude 835, which is larger than the magnitude 828). In yet another embodiment, shortly after the pulse (e.g., $T_{pulse3}$), the oscillation signal 518 (e.g., $F_{osc}$) remains at the logic low level, and the ramp signal 536 (e.g., $V_{ramp}$) increases in magnitude. For example, shortly after the pulse (e.g., $T_{pulse3}$), the modulation signal 520 (e.g., PWM) remains at the logic low level and the signal 538 (e.g., $V_{sp}$) remains at the magnitude 891.

According to one embodiment, a system controller for regulating a power converter includes: a first controller terminal configured to output a drive signal to a switch to affect a current flowing through a primary winding of a power converter, the drive signal being associated with a switching period including an on-time period and an off-time period, the switching period corresponding to a switching frequency; and a second controller terminal configured to receive a feedback signal associated with an output voltage related to a secondary winding of the power converter, the secondary winding being coupled to the primary winding. The first controller terminal is further configured to: output the drive signal to close the switch during the on-time period; and output the drive signal to open the switch during the off-time period. A duty cycle is equal to a duration of the on-time period divided by a duration of the switching period. The system controller is configured to set the switching frequency to one or more frequency magnitudes, each of the one or more frequency magnitudes being smaller than or equal to an upper frequency limit. The system controller is further configured to: increase the upper frequency limit within a first magnitude range in response to the increasing duty cycle; and decrease the upper frequency limit within the first magnitude range in response to the decreasing duty cycle. For example, the system controller is implemented according to FIG. 4, FIG. 5, FIG. 6, FIG. 7, and/or FIG. 8.

According to another embodiment, a system controller for regulating a power converter includes: an oscillator configured to receive an oscillation current and generate a ramp signal and a clock signal based at least in part on the oscillation current, the ramp signal and the clock signal being associated with an operating frequency of the system controller; a modulation component configured to generate a modulation signal based at least in part on the clock signal; a sample-and-hold component configured to sample the ramp signal in response to the modulation signal and generate a sampled signal based at least in part on the ramp signal; a low pass filter configured to generate a filtered signal based at least in part on the sampled signal; a first transconductance amplifier configured to generate a first current based at least in part on the filtered signal; a first summation component configured to receive the first current and a second current and generate the oscillation current based at least in part on the first current and the second current; and a driver configured to generate a drive signal based at least in part on the modulation signal and output the drive signal to a switch to affect a third current flowing through a primary winding of a power converter. For example, the system controller is implemented according to at least FIG. 4 and/or FIG. 7.

According to yet another embodiment, a system controller for regulating a power converter includes: a first controller terminal configured to receive a first signal related to a first current flowing through a primary winding of a power converter, the primary winding being configured to receive an input voltage; and a second controller terminal configured to output a drive signal to a switch to affect the first current flowing through the primary winding of the power converter, the drive signal being associated with a switching period corresponding to a switching frequency. The system controller is configured to set the switching frequency to one or more frequency magnitudes, each of the one or more frequency magnitudes being smaller than or equal to an upper frequency limit. The system controller is further configured to: increase the upper frequency limit within a first magnitude range in response to the decreasing input voltage; and decrease the upper frequency limit within the first magnitude range in response to the increasing input voltage. For example, the system controller is implemented according to FIG. 4, FIG. 5, FIG. 6, FIG. 7, and/or FIG. 8.

In one embodiment, a method for regulating a power converter includes: receiving a feedback signal associated with an output voltage related to a secondary winding of a power converter, the secondary winding being coupled to a primary winding of the power converter; determining a switching frequency to one or more frequency magnitudes based at least in part on the feedback signal, each of the one or more frequency magnitudes being smaller than or equal to an upper frequency limit; generating a drive signal associated with the switching frequency, the switching frequency corresponding to a switching period, the switching period including an on-time period and an off-time period; outputting the drive signal to a switch to affect a current flowing through the primary winding. The outputting the drive signal to a switch to affect a current flowing through the primary winding includes: outputting the drive signal to close the switch during the on-time period; and outputting the drive signal to open the switch during the off-time period. A duty cycle is equal to a duration of the on-time period divided by a duration of the switching period. The setting a switching frequency to one or more frequency magnitudes includes: increasing the upper frequency limit within a first magnitude range in response to the increasing duty cycle; and decreasing the upper frequency limit within the first magnitude range in response to the decreasing duty cycle. For example, the method is implemented according to FIG. 4, FIG. 5, FIG. 6, FIG. 7, and/or FIG. 8.

In another embodiment, a method for regulating a power converter includes: receiving an oscillation current; generating a ramp signal and a clock signal based at least in part on the oscillation current, the ramp signal and the clock signal being associated with an operating frequency; receiving the clock signal; generating a modulation signal based at least in part on the clock signal; receiving the ramp signal and the modulation signal; sampling the ramp signal in response to the modulation signal; generating a sampled signal based at least in part on the ramp signal; receiving the sampled signal; generating a filtered signal based at least in part on the sampled signal; receiving the filtered signal; generating a first current based at least in part on the filtered signal; receiving the first current and a second current; generating the oscillation current based at least in part on the first current and the second current; receiving the modulation signal; generating a drive signal based at least in part on the modulation signal; and outputting the drive signal to a switch to affect a third current flowing through a primary winding of a power converter. For example, the method is implemented according to at least FIG. 4 and/or FIG. 7.

In yet another embodiment, a method for regulating a power converter includes: receiving a first signal related to a current flowing through a primary winding of a power converter, the primary winding being configured to receive an input voltage; determining a switching frequency to one or more frequency magnitudes, each of the one or more frequency magnitudes being smaller than or equal to an upper frequency limit; generating a drive signal associated with the switching frequency, the switching frequency corresponding to a switching period; outputting the drive signal to a switch to affect the current flowing through the primary winding of the power converter. The determining a switching frequency to one or more frequency magnitudes includes: increasing the upper frequency limit within a first magnitude range in response to the decreasing input voltage; and decreasing the upper frequency limit within the first magnitude range in response to the increasing input voltage. For example, the method is implemented according to FIG. 4, FIG. 5, FIG. 6, FIG. 7, and/or FIG. 8.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for regulating a power converter, the system controller comprising:
   a first controller terminal configured to output a drive signal to a switch to affect a primary current flowing through a primary winding of the power converter, the drive signal being associated with a switching period including an on-time period and an off-time period, the switching period corresponding to a switching frequency; and
   a second controller terminal configured to receive a feedback signal associated with an output voltage related to a secondary winding of the power converter, the secondary winding being coupled to the primary winding;
   wherein the first controller terminal is further configured to:
      output the drive signal to close the switch during the on-time period; and
      output the drive signal to open the switch during the off-time period;
   wherein a duty cycle is equal to a duration of the on-time period divided by a duration of the switching period;
   wherein the system controller is configured to set the switching frequency to one or more frequency magnitudes, each of the one or more frequency magnitudes being smaller than or equal to an upper frequency limit;
   wherein the system controller is further configured to:
      increase the upper frequency limit within a first magnitude range in response to increasing of the duty cycle; and
   decrease the upper frequency limit within the first magnitude range in response to decreasing of the duty cycle.

2. The system controller of claim 1 wherein the system controller is further configured to:
   in response to the feedback signal being smaller than a first magnitude, keep the switching frequency approximately equal in magnitude to a lower frequency limit;
   in response to the feedback signal being no smaller than the first magnitude and no larger than a second magnitude, increase the switching frequency in magnitude between the lower frequency limit and a first frequency magnitude;
   in response to the feedback signal being larger than the second magnitude and smaller than a third magnitude, keep the switching frequency approximately equal in magnitude to the first frequency magnitude;
   in response to the feedback signal being no smaller than the third magnitude and no larger than a fourth magnitude, increase the switching frequency in magnitude between the first frequency magnitude and the upper frequency limit; and
   in response to the feedback signal being larger than the fourth magnitude, keep the switching frequency approximately equal in magnitude to the upper frequency limit.

3. The system controller of claim 1 wherein the system controller is further configured to increase linearly the upper frequency limit within the first magnitude range in response to increasing of the duty cycle.

4. The system controller of claim 1 wherein the system controller is further configured to, in response to the duty cycle being smaller than a duty cycle magnitude, increase the upper frequency limit between a first frequency magnitude and a second frequency magnitude in response to increasing of the duty cycle, the first magnitude range being determined by the first frequency magnitude and the second frequency magnitude, the second frequency magnitude being larger than the first frequency magnitude.

5. The system controller of claim 4 wherein the system controller is further configured to, in response to the duty cycle being no smaller than the duty cycle magnitude, keep the upper frequency limit approximately equal in magnitude to the second frequency magnitude.

6. The system controller of claim 1, further comprising:
an oscillator configured to receive an oscillation current and generate a ramp signal and a clock signal based at least in part on the oscillation current, the ramp signal and the clock signal being associated with an operating frequency of the system controller;
a modulation component configured to generate a modulation signal based at least in part on the clock signal;
a sample-and-hold component configured to sample the ramp signal in response to the modulation signal and generate a sampled signal based at least in part on the ramp signal;
a low pass filter configured to generate a filtered signal based at least in part on the sampled signal;
a first transconductance amplifier configured to generate a first current based at least in part on the filtered signal;
a first summation component configured to receive the first current and a second current and generate the oscillation current based at least in part on the first current and the second current; and
a driver configured to generate the drive signal based at least in part on the modulation signal.

7. The system controller of claim 6, further comprising a second summation component configured to receive a third current and a fourth current and generate the second current based at least in part on the third current and the fourth current, the third current being associated with the feedback signal.

8. The system controller of claim 7, further comprising: a second transconductance amplifier configured to generate the third current based at least in part on the feedback signal.

9. The system controller of claim 7 wherein the second summation component includes an adder configured to receive the third current and the fourth current and generate the second current, the second current being equal in magnitude to a sum of the third current and the fourth current.

10. The system controller of claim 6 wherein the first summation component includes an adder configured to receive the first current and the second current and generate the oscillation current, the oscillation current being equal in magnitude to a sum of the first current and the second current.

11. A system controller for regulating a power converter, the system controller comprising:
an oscillator configured to receive an oscillation current and generate a ramp signal and a clock signal based at least in part on the oscillation current, the ramp signal and the clock signal being associated with an operating frequency of the system controller;
a modulation component configured to generate a modulation signal based at least in part on the clock signal;
a sample-and-hold component configured to sample the ramp signal in response to the modulation signal and generate a sampled signal based at least in part on the ramp signal;
a low pass filter configured to generate a filtered signal based at least in part on the sampled signal;
a first transconductance amplifier configured to generate a first current based at least in part on the filtered signal;
a first summation component configured to receive the first current and a second current and generate the oscillation current based at least in part on the first current and the second current; and
a driver configured to generate a drive signal based at least in part on the modulation signal and output the drive signal to a switch to affect a third current flowing through a primary winding of the power converter.

12. The system controller of claim 11 wherein the sample-and-hold component is further configured to sample the ramp signal in response to the modulation signal being at a first logic level.

13. The system controller of claim 11, further comprising a second summation component configured to receive a third current and a fourth current and generate the second current based at least in part on the third current and the fourth current, the third current being related to a feedback signal associated with an output voltage of the power converter.

14. The system controller of claim 13, further comprising:
a second transconductance amplifier configured to generate the third current based at least in part on the feedback signal associated with the output voltage, the output voltage being related to a secondary winding of the power converter, the secondary winding being coupled to the primary winding.

15. The system controller of claim 13 wherein the second summation component includes an adder configured to receive the third current and the fourth current and generate the second current, the second current being equal in magnitude to a sum of the third current and the fourth current.

16. The system controller of claim 13 wherein the first summation component includes an adder configured to receive the first current and the second current and generate the oscillation current, the oscillation current being equal in magnitude to a sum of the first current and the second current.

17. The system controller of claim 13 wherein:
the drive signal is associated with a switching period including an on-time period and an off-time period, the switching period corresponding to a switching frequency;
the driver is further configured to:
output the drive signal to close the switch during the on-time period; and
output the drive signal to open the switch during the off-time period;
a duty cycle is equal to a duration of the on-time period divided by a duration of the switching period;
the system controller is configured to set the switching frequency to one or more frequency magnitudes, each of the one or more frequency magnitudes being smaller than or equal to an upper frequency limit; and
the system controller is further configured to:
increase the upper frequency limit within a magnitude range in response to increasing of the duty cycle; and
decrease the upper frequency limit within the magnitude range in response to decreasing of the duty cycle.

18. The system controller of claim 17 wherein the system controller is further configured to:
in response to the feedback signal being smaller than a first magnitude, keep the switching frequency approximately equal in magnitude to a lower frequency limit;
in response to the feedback signal being no smaller than the first magnitude and no larger than a second magnitude, increase the switching frequency in magnitude between the lower frequency limit and a first frequency magnitude;

in response to the feedback signal being larger than the second magnitude and smaller than a third magnitude, keep the switching frequency approximately equal in magnitude to the first frequency magnitude;

in response to the feedback signal being no smaller than the third magnitude and no larger than a fourth magnitude, increase the switching frequency in magnitude between the first frequency magnitude and the upper frequency limit; and in response to the feedback signal being larger than the fourth magnitude, keep the switching frequency approximately equal in magnitude to the upper frequency limit.

19. The system controller of claim 17 wherein the system controller is further configured to increase linearly the upper frequency limit within the magnitude range in response to increasing of the duty cycle.

20. The system controller of claim 17 wherein the system controller is further configured to, in response to the duty cycle being smaller than a duty cycle magnitude, increase the upper frequency limit between a first frequency magnitude and a second frequency magnitude in response to increasing of the duty cycle, the magnitude range being determined by the first frequency magnitude and the second frequency magnitude, the second frequency magnitude being larger than the first frequency magnitude.

21. The system controller of claim 20 wherein the system controller is further configured to, in response to the duty cycle being no smaller than the duty cycle magnitude, keep the upper frequency limit approximately equal in magnitude to the second frequency magnitude.

22. The system controller of claim 11, further comprising:
a controller terminal configured to receive a first signal related to a fourth current flowing through a primary winding of the power converter, the primary winding being configured to receive an input voltage;
wherein the system controller is configured to set the switching frequency to one or more frequency magnitudes, each of the one or more frequency magnitudes being smaller than or equal to an upper frequency limit;
wherein the system controller is further configured to:
increase the upper frequency limit within a magnitude range in response to decreasing of the input voltage; and
decrease the upper frequency limit within the magnitude range in response to increasing of the input voltage.

23. A system controller for regulating a power converter, the system controller comprising:
a first controller terminal configured to receive a first signal related to a first current flowing through a primary winding of the power converter, the primary winding being configured to receive an input voltage; and
a second controller terminal configured to output a drive signal to a switch to affect the first current flowing through the primary winding of the power converter, the drive signal being associated with a switching period corresponding to a switching frequency;
wherein the system controller is configured to set the switching frequency to one or more frequency magnitudes, each of the one or more frequency magnitudes being smaller than or equal to an upper frequency limit;
wherein the system controller is further configured to:
increase the upper frequency limit within a first magnitude range in response to decreasing of the input voltage; and
decrease the upper frequency limit within the first magnitude range in response to increasing of the input voltage.

24. The system controller of claim 23, further comprising:
a third controller terminal configured to receive a feedback signal associated with an output voltage related to a secondary winding of the power converter, the secondary winding being coupled to the primary winding;
wherein:
the switching period includes an on-time period and an off-time period;
the second controller terminal is further configured to:
output the drive signal to close the switch during the on-time period; and
output the drive signal to open the switch during the off-time period; and
a duty cycle is equal to a duration of the on-time period divided by a duration of the switching period;
wherein the system controller is further configured to:
increase the upper frequency limit within a second magnitude range in response to increasing of the duty cycle; and
decrease the upper frequency limit within the second magnitude range in response to decreasing of the duty cycle.

25. The system controller of claim 24 wherein the system controller is further configured to:
in response to the feedback signal being smaller than a first magnitude, keep the switching frequency approximately equal in magnitude to a lower frequency limit;
in response to the feedback signal being no smaller than the first magnitude and no larger than a second magnitude, increase the switching frequency in magnitude between the lower frequency limit and a first frequency magnitude;
in response to the feedback signal being larger than the second magnitude and smaller than a third magnitude, keep the switching frequency approximately equal in magnitude to the first frequency magnitude;
in response to the feedback signal being no smaller than the third magnitude and no larger than a fourth magnitude, increase the switching frequency in magnitude between the first frequency magnitude and the upper frequency limit; and
in response to the feedback signal being larger than the fourth magnitude, keep the switching frequency approximately equal in magnitude to the upper frequency limit.

26. The system controller of claim 24 wherein the system controller is further configured to increase linearly the upper frequency limit within the second magnitude range in response to increasing of the duty cycle.

27. The system controller of claim 24 wherein the system controller is further configured to, in response to the duty cycle being smaller than a duty cycle magnitude, increase the upper frequency limit between a first frequency magnitude and a second frequency magnitude in response to increasing of the duty cycle, the second magnitude range being determined by the first frequency magnitude and the second frequency magnitude, the second frequency magnitude being larger than the first frequency magnitude.

28. The system controller of claim 27 wherein the system controller is further configured to, in response to the duty cycle being no smaller than the duty cycle magnitude, keep the upper frequency limit approximately equal in magnitude to the second frequency magnitude.

29. The system controller of claim 24 wherein the system controller is further configured to:
increase the duty cycle in response to decreasing of the input voltage; and
decrease the duty cycle in response to increasing of the input voltage.

30. The system controller of claim 23, further comprising:
an oscillator configured to receive an oscillation current and generate a ramp signal and a clock signal based at least in part on the oscillation current, the ramp signal and the clock signal being associated with an operating frequency of the system controller;
a modulation component configured to generate a modulation signal based at least in part on the clock signal;
a sample-and-hold component configured to sample the ramp signal in response to the modulation signal and generate a sampled signal based at least in part on the ramp signal;
a low pass filter configured to generate a filtered signal based at least in part on the sampled signal;
a first transconductance amplifier configured to generate a second current based at least in part on the filtered signal;
a first summation component configured to receive the second current and a third current and generate the oscillation current based at least in part on the second current and the third current; and
a driver configured to generate the drive signal based at least in part on the modulation signal.

31. The system controller of claim 30, further comprising a second summation component configured to receive a fourth current and a fifth current and generate the third current based at least in part on the fourth current and the fifth current, the fourth current being associated with the feedback signal.

32. The system controller of claim 31, further comprising: a second transconductance amplifier configured to generate the fourth current based at least in part on the feedback signal.

33. The system controller of claim 31 wherein the second summation component includes an adder configured to receive the fourth current and the fifth current and generate the third current, the third current being equal in magnitude to a sum of the fourth current and the fifth current.

34. The system controller of claim 30 wherein the first summation component includes an adder configured to receive the second current and the third current and generate the oscillation current, the oscillation current being equal in magnitude to a sum of the second current and the third current.

35. A method for regulating a power converter, the method comprising:
receiving a feedback signal associated with an output voltage related to a secondary winding of the power converter, the secondary winding being coupled to a primary winding of the power converter;
determining a switching frequency to one or more frequency magnitudes based at least in part on the feedback signal, each of the one or more frequency magnitudes being smaller than or equal to an upper frequency limit;
generating a drive signal associated with the switching frequency, the switching frequency corresponding to a switching period, the switching period including an on-time period and an off-time period; and
outputting the drive signal to a switch to affect a current flowing through the primary winding;
wherein the outputting the drive signal to a switch to affect a current flowing through the primary winding includes:
outputting the drive signal to close the switch during the on-time period; and
outputting the drive signal to open the switch during the off-time period;
wherein a duty cycle is equal to a duration of the on-time period divided by a duration of the switching period;
wherein the setting a switching frequency to one or more frequency magnitudes includes:
increasing the upper frequency limit within a first magnitude range in response to increasing of the duty cycle; and
decreasing the upper frequency limit within the first magnitude range in response to decreasing of the duty cycle.

36. The method of claim 35, further comprising:
in response to the feedback signal being smaller than a first magnitude, keeping the switching frequency approximately equal in magnitude to a lower frequency limit;
in response to the feedback signal being no smaller than the first magnitude and no larger than a second magnitude, increasing the switching frequency in magnitude between the lower frequency limit and a first frequency magnitude;
in response to the feedback signal being larger than the second magnitude and smaller than a third magnitude, keeping the switching frequency approximately equal in magnitude to the first frequency magnitude;
in response to the feedback signal being no smaller than the third magnitude and no larger than a fourth magnitude, increasing the switching frequency in magnitude between the first frequency magnitude and the upper frequency limit; and
in response to the feedback signal being larger than the fourth magnitude, keeping the switching frequency approximately equal in magnitude to the upper frequency limit.

37. The method of claim 35, further comprising:
increasing linearly the upper frequency limit within the first magnitude range in response to increasing of the duty cycle.

38. The method of claim 35, further comprising:
in response to the duty cycle being smaller than a duty cycle magnitude, increasing the upper frequency limit between a first frequency magnitude and a second frequency magnitude in response to increasing of the duty cycle, the first magnitude range being determined by the first frequency magnitude and the second frequency magnitude, the second frequency magnitude being larger than the first frequency magnitude.

39. A method for regulating a power converter, the method comprising:
receiving an oscillation current;
generating a ramp signal and a clock signal based at least in part on the oscillation current, the ramp signal and the clock signal being associated with an operating frequency;
receiving the clock signal;
generating a modulation signal based at least in part on the clock signal;
receiving the ramp signal and the modulation signal;
sampling the ramp signal in response to the modulation signal;

generating a sampled signal based at least in part on the ramp signal;
receiving the sampled signal;
generating a filtered signal based at least in part on the sampled signal;
receiving the filtered signal;
generating a first current based at least in part on the filtered signal;
receiving the first current and a second current;
generating the oscillation current based at least in part on the first current and the second current;
receiving the modulation signal;
generating a drive signal based at least in part on the modulation signal; and
outputting the drive signal to a switch to affect a third current flowing through a primary winding of the power converter.

40. The method of claim 39, further comprising:
receiving a third current and a fourth current; and
generating the second current based at least in part on the third current and the fourth current, the third current being related to a feedback signal associated with an output voltage of the power converter.

41. The method of claim 40 wherein:
the drive signal is associated with a switching period including an on-time period and an off-time period, the switching period corresponding to a switching frequency.

42. The method of claim 41, further comprising:
outputting the drive signal to close the switch during the on-time period; and
outputting the drive signal to open the switch during the off-time period;
wherein a duty cycle is equal to a duration of the on-time period divided by a duration of the switching period.

43. The method of claim 40, further comprising:
setting the switching frequency to one or more frequency magnitudes, each of the one or more frequency magnitudes being smaller than or equal to an upper frequency limit;
increasing the upper frequency limit within a magnitude range in response to increasing of the duty cycle; and
decreasing the upper frequency limit within the magnitude range in response to decreasing of the duty cycle.

44. The method of claim 43, further comprising:
increasing linearly the upper frequency limit within the magnitude range in response to increasing of the duty cycle.

45. The method of claim 43, further comprising:
in response to the duty cycle being smaller than a duty cycle magnitude, increasing the upper frequency limit between a first frequency magnitude and a second frequency magnitude in response to increasing of the duty cycle, the magnitude range being determined by the first frequency magnitude and the second frequency magnitude, the second frequency magnitude being larger than the first frequency magnitude.

46. The method of claim 45, further comprising:
in response to the duty cycle being no smaller than the duty cycle magnitude, keeping the upper frequency limit approximately equal in magnitude to the second frequency magnitude.

47. The method of claim 40, further comprising:
in response to the feedback signal being smaller than a first magnitude, keeping the switching frequency approximately equal in magnitude to a lower frequency limit;

in response to the feedback signal being no smaller than the first magnitude and no larger than a second magnitude, increasing the switching frequency in magnitude between the lower frequency limit and a first frequency magnitude;
in response to the feedback signal being larger than the second magnitude and smaller than a third magnitude, keeping the switching frequency approximately equal in magnitude to the first frequency magnitude;
in response to the feedback signal being no smaller than the third magnitude and no larger than a fourth magnitude, increasing the switching frequency in magnitude between the first frequency magnitude and the upper frequency limit; and
in response to the feedback signal being larger than the fourth magnitude, keeping the switching frequency approximately equal in magnitude to the upper frequency limit.

48. A method for regulating a power converter, the method comprising:
receiving a first signal related to a current flowing through a primary winding of the power converter, the primary winding being configured to receive an input voltage;
determining a switching frequency to one or more frequency magnitudes, each of the one or more frequency magnitudes being smaller than or equal to an upper frequency limit;
generating a drive signal associated with the switching frequency, the switching frequency corresponding to a switching period; and
outputting the drive signal to a switch to affect the current flowing through the primary winding of the power converter;
wherein the determining a switching frequency to one or more frequency magnitudes includes:
increasing the upper frequency limit within a first magnitude range in response to decreasing of the input voltage; and
decreasing the upper frequency limit within the first magnitude range in response to increasing of the input voltage.

49. The method of claim 48, further comprising:
receiving a feedback signal associated with an output voltage related to a secondary winding of the power converter, the secondary winding being coupled to the primary winding, the switching period including an on-time period and an off-time period;
outputting the drive signal to close the switch during the on-time period;
outputting the drive signal to open the switch during the off-time period, a duty cycle being equal to a duration of the on-time period divided by a duration of the switching period;
increasing the upper frequency limit within a second magnitude range in response to increasing of the duty cycle; and
decreasing the upper frequency limit within the second magnitude range in response to decreasing of the duty cycle.

50. The method of claim 49, further comprising:
in response to the feedback signal being smaller than a first magnitude, keeping the switching frequency approximately equal in magnitude to a lower frequency limit;
in response to the feedback signal being no smaller than the first magnitude and no larger than a second magnitude, increasing the switching frequency in magnitude between the lower frequency limit and a first frequency magnitude;

in response to the feedback signal being larger than the second magnitude and smaller than a third magnitude, keeping the switching frequency approximately equal in magnitude to the first frequency magnitude;

in response to the feedback signal being no smaller than the third magnitude and no larger than a fourth magnitude, increasing the switching frequency in magnitude between the first frequency magnitude and the upper frequency limit; and in response to the feedback signal being larger than the fourth magnitude, keeping the switching frequency approximately equal in magnitude to the upper frequency limit.

51. The method of claim 49, further comprising:

in response to the duty cycle being smaller than a duty cycle magnitude, increasing the upper frequency limit between a first frequency magnitude and a second frequency magnitude in response to increasing of the duty cycle, the second magnitude range being determined by the first frequency magnitude and the second frequency magnitude, the second frequency magnitude being larger than the first frequency magnitude.

* * * * *